(12) United States Patent
Kim

(10) Patent No.: US 10,564,250 B2
(45) Date of Patent: Feb. 18, 2020

(54) DEVICE AND METHOD FOR MEASURING FLIGHT DATA OF FLYING OBJECTS USING HIGH SPEED VIDEO CAMERA AND COMPUTER READABLE RECORDING MEDIUM HAVING PROGRAM FOR PERFORMING THE SAME

(71) Applicant: Strokeplay, Seoul (KR)

(72) Inventor: Euisok Kim, Seongnam-si (KR)

(73) Assignee: Strokeplay, Seoul (KR)

( * ) Notice: Subject to any disclaimer, the term of this patent is extended or adjusted under 35 U.S.C. 154(b) by 40 days.

(21) Appl. No.: 15/812,593

(22) Filed: Nov. 14, 2017

(65) Prior Publication Data

US 2018/0136306 A1 May 17, 2018

(30) Foreign Application Priority Data

Nov. 15, 2016 (KR) ........................ 10-2016-0152027

(51) Int. Cl.
*H04N 7/18* (2006.01)
*H04N 9/47* (2006.01)
(Continued)

(52) U.S. Cl.
CPC .......... *G01S 3/786* (2013.01); *A63B 24/0021* (2013.01); *A63B 69/3658* (2013.01);
(Continued)

(58) Field of Classification Search
None
See application file for complete search history.

(56) References Cited

U.S. PATENT DOCUMENTS

| | | | |
|---|---|---|---|
| 2005/0026710 A1* | 2/2005 | Pao | ..................... A63B 24/0021 |
| | | | 473/141 |
| 2010/0013928 A1* | 1/2010 | Haug | ....................... B60R 1/00 |
| | | | 348/148 |

(Continued)

FOREIGN PATENT DOCUMENTS

| | | |
|---|---|---|
| JP | 2002-148269 A | 5/2002 |
| KR | 100871595 | 12/2008 |

OTHER PUBLICATIONS

Office Action for Korean Patent Application No. KR 10-2016-0152027, dated Nov. 21, 2017, 6 Pages (With Concise Explanation of Relevance).

(Continued)

*Primary Examiner* — Talha M Nawaz
(74) *Attorney, Agent, or Firm* — Fenwick & West LLP

(57) ABSTRACT

A device for measuring flight data of a flying object by using a high speed image camera is provided. The device includes: a launch signal generator which determines whether the flying object is launched and generates a signal when it is determined that the flying object is launched; and a high speed image camera system which includes an integrated control unit and a high speed image camera which photographs the flying object after the launch signal generator generates the launch signal. The integrated control unit controls the high speed image camera and calculates preliminary flight data and final flight data from images photographed by the high speed image camera. A position through which the flying object passes at a point in time when a predetermined photographing time elapses is estimated using the preliminary flight data, and, on the basis of the position, an image capture area is set.

20 Claims, 5 Drawing Sheets

(51) Int. Cl.
*G01S 3/786* (2006.01)
*A63B 24/00* (2006.01)
*A63B 69/36* (2006.01)
*G01P 3/38* (2006.01)

(52) U.S. Cl.
CPC ........ *G01P 3/38* (2013.01); *A63B 2024/0031* (2013.01); *A63B 2024/0034* (2013.01)

(56) References Cited

U.S. PATENT DOCUMENTS

| | | | | |
|---|---|---|---|---|
| 2010/0304876 | A1* | 12/2010 | Hohla | A63B 24/0003 473/199 |
| 2011/0184593 | A1* | 7/2011 | Swope | G05D 1/101 701/12 |
| 2012/0154462 | A1* | 6/2012 | Hempson | G09G 3/342 345/691 |
| 2015/0116353 | A1* | 4/2015 | Miura | G06T 11/60 345/632 |
| 2016/0178358 | A1* | 6/2016 | Miyasaka | G01B 11/25 356/610 |
| 2017/0045894 | A1* | 2/2017 | Canoy | G05D 1/0676 |

OTHER PUBLICATIONS

Japan Patent Office, Notice of Reasons for Refusal, JP Patent Application No. 2017-214984, dated Oct. 16, 2018, six pages.

* cited by examiner

[Fig. 1]
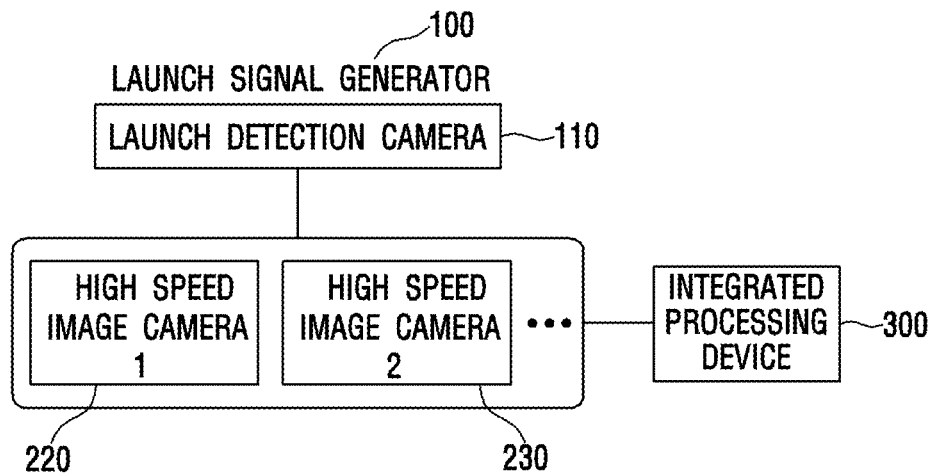
[Fig. 2]
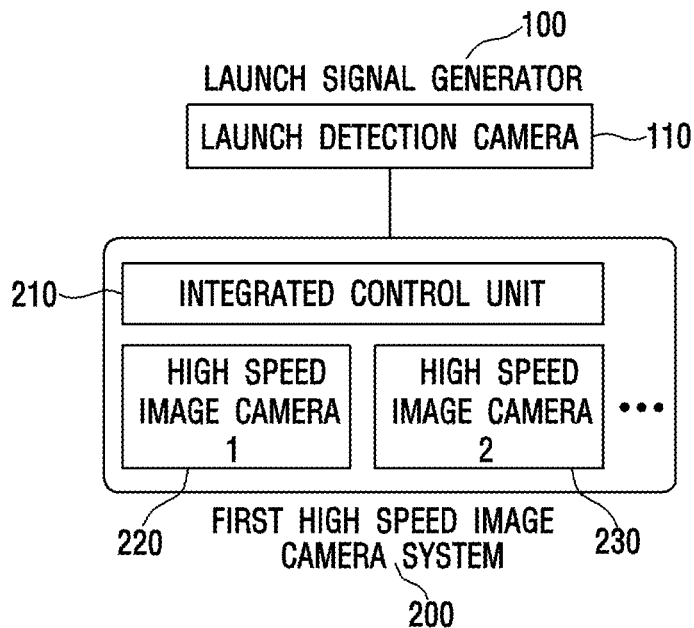

[Fig. 3]
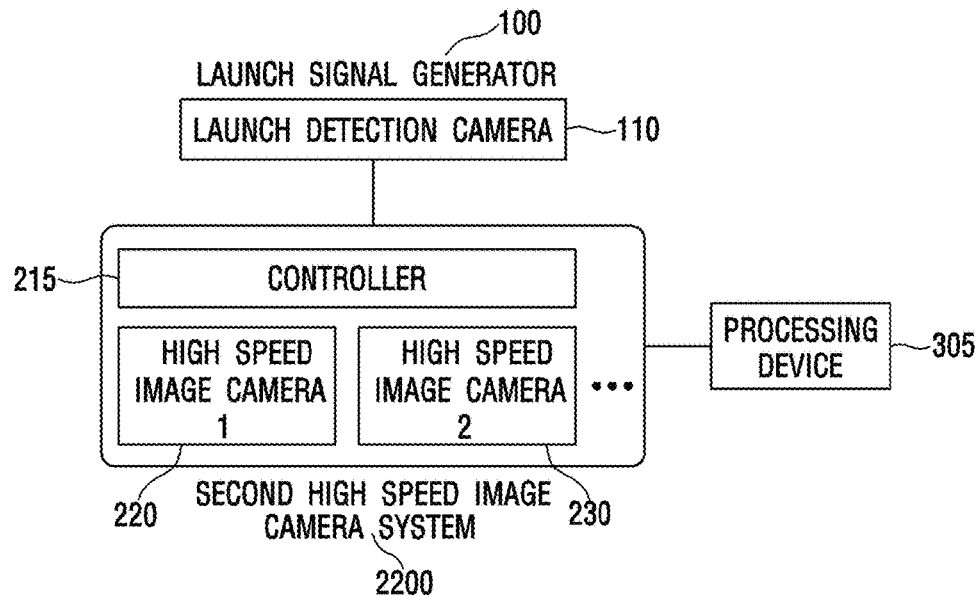
[Fig. 4]
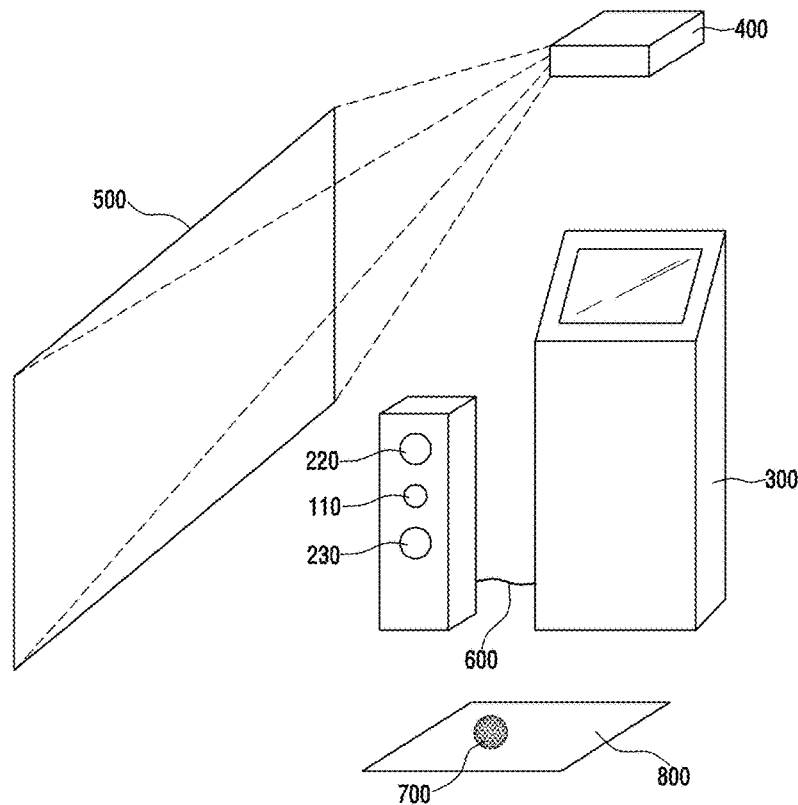

[Fig. 5]
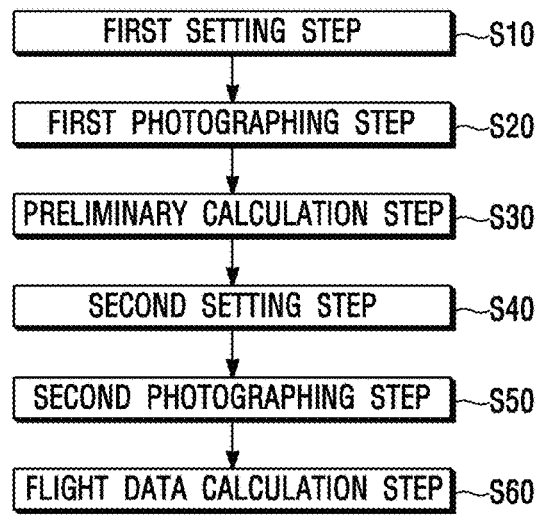
[Fig. 6]
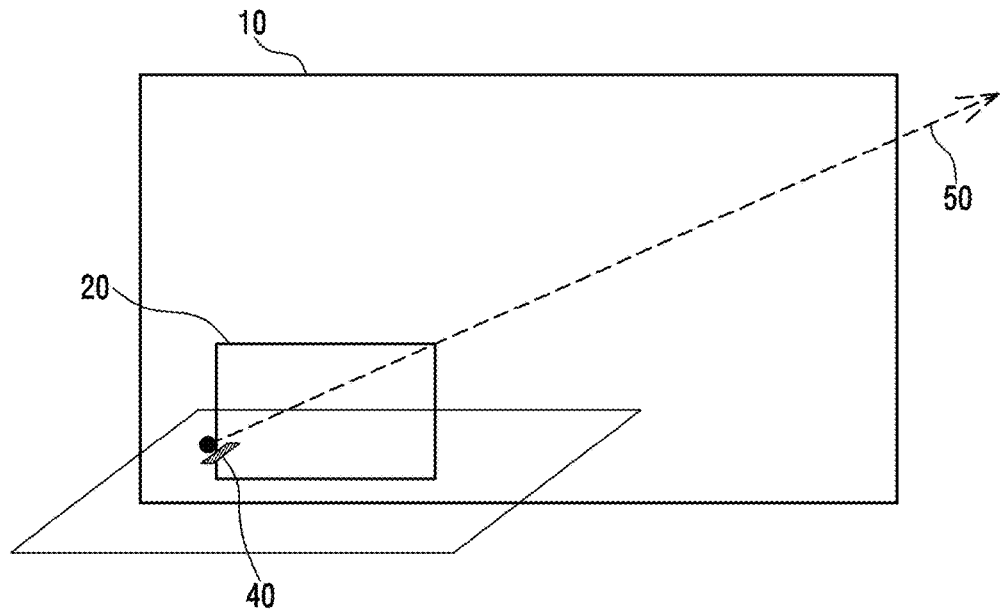

[Fig. 7]
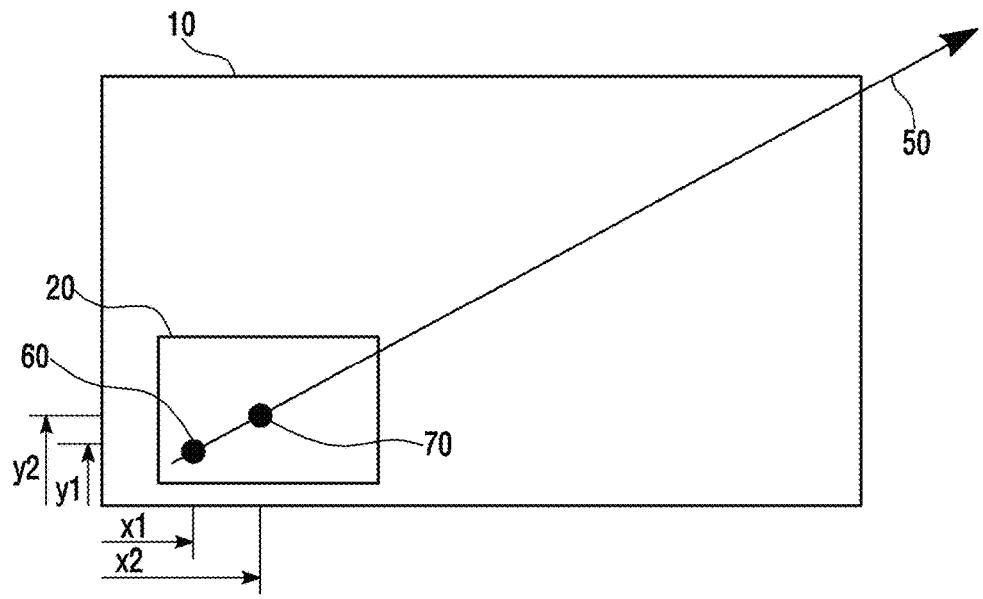
[Fig. 8]
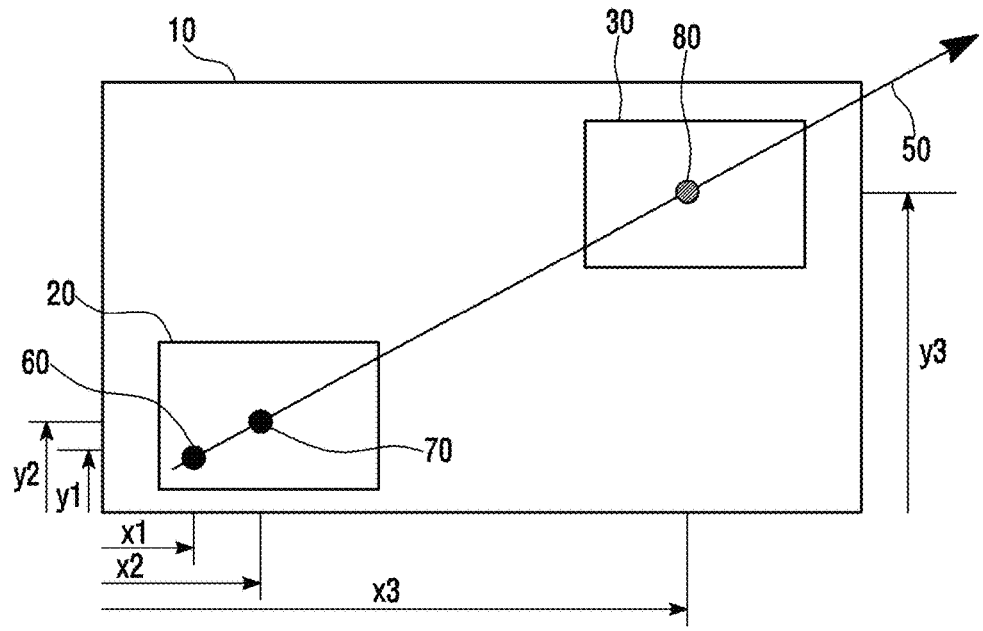

[Fig. 9]
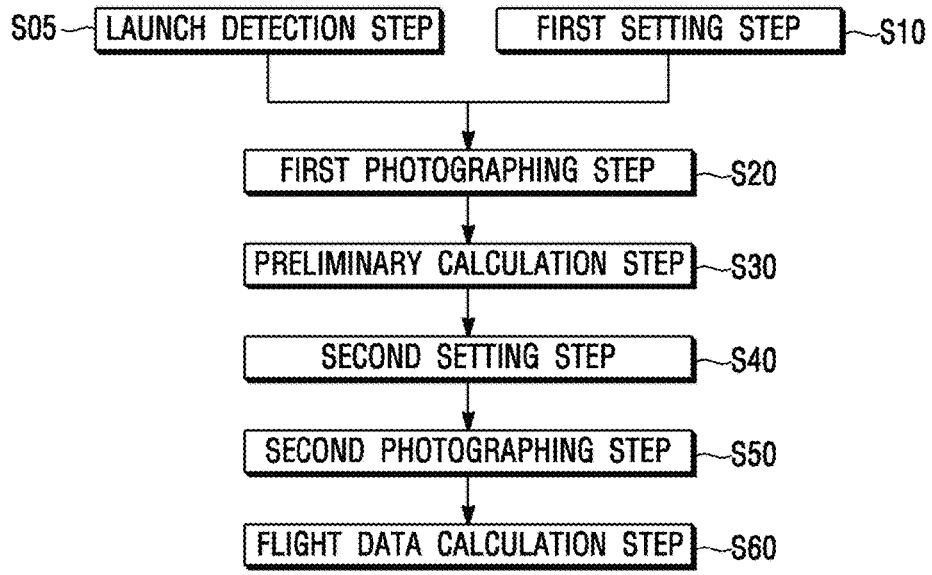
[Fig. 10]
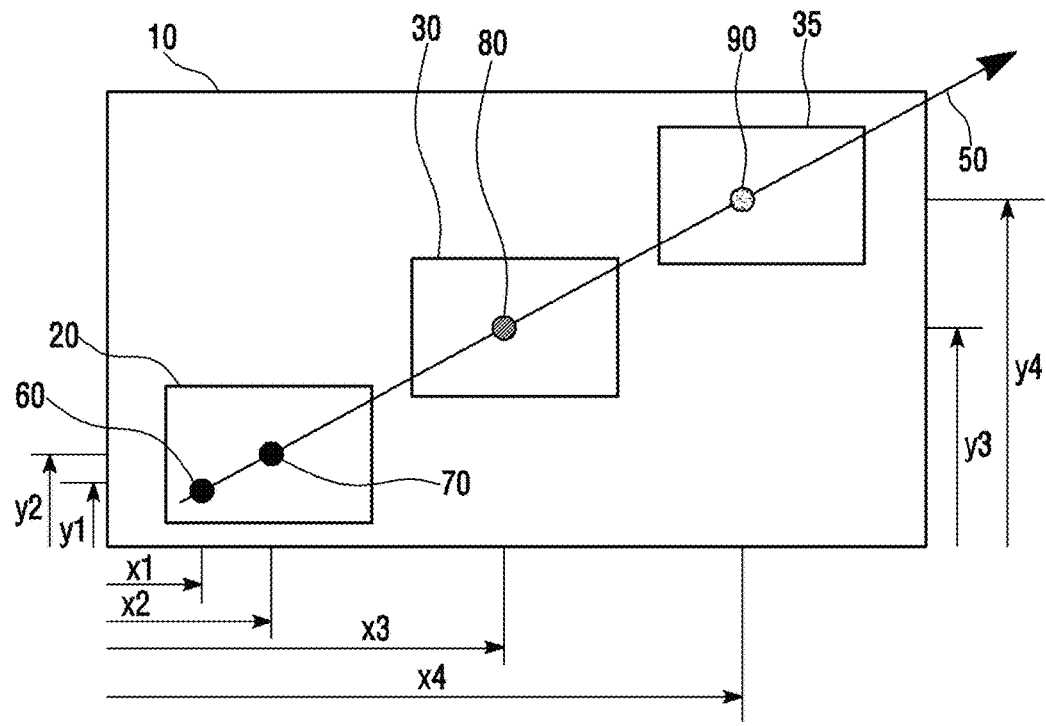

DEVICE AND METHOD FOR MEASURING FLIGHT DATA OF FLYING OBJECTS USING HIGH SPEED VIDEO CAMERA AND COMPUTER READABLE RECORDING MEDIUM HAVING PROGRAM FOR PERFORMING THE SAME

BACKGROUND

This application claims the benefit of the Korean Patent Application No. 10-2016-0152027 filed on Nov. 15, 2016, which is hereby incorporated by reference in its entirety.

BACKGROUND

Field

The present disclosure relates to a device and method for measuring flight data of a flying object by using a high speed image camera, and a computer-readable recording medium having a program for performing the same, and more particularly to a device and method which obtain an image of a flying object such as a golf ball or baseball by using one or multiple high speed cameras, analyze the obtained image by a three-dimensional stereo image processing techniques, etc., and then measure the flight data, and a computer-readable recording medium having a program for performing the same.

Description of the Related Art

In order to accurately predict the flight trajectory of a golf ball or baseball hit in a facility such as an indoor golf practice range or indoor baseball practice field, the initial flight data of the ball must be accurately measured. For this, many existing systems use a method for obtaining many initial flight images of the ball sequentially by using one or a plurality of high speed cameras, and using various image processing techniques to calculate the flight data from the obtained images. However, as an example regarding the golf ball, in order to measure the maximum launch rate of 80 to 90 m/s and the amount of rotation of 10,000 rpm, high-quality ultra-high speed images of a wide area must be photographed more than several times. This requires expensive high speed camera equipment and requires expensive high speed communication and computing equipment for the purpose of processing and analyzing the image in real time.

Korean Patent No. 1044887, "a method for measuring a flight data of a golf ball by using a photographed image of a high speed CCD camera" discloses a method for measuring flight data of a golf ball in order to measure flight distance, flight speed, and flight direction of the golf ball by using photographed images of the golf ball flying in an indoor golf practice range, etc., in order to show the ball flight trajectory on an indoor screen, etc. According to the above method, the high speed CCD camera photographs images of the golf ball repeatedly and continuously such that many frames of the golf ball image are included in one sheet of image, and then the flight distance, flight speed, and flight direction of the golf ball are calculated from the photographed image by using a computer device connected to a camera system. However, the method does not consider the rotation of the golf ball, and therefore, the flight data is inaccurate.

Additionally, Korean Patent No. 1230613, "a system and method for measuring flight information of a spherical object on the basis of a CMOS sensor" discloses a system configured as follows. A total area of a camera sensor is divided into a plurality of areas (e.g., three to four areas) in a direction perpendicular to the general direction in which a ball passes through the area. A line trigger camera device (or similar device) is separately installed and works together with the camera in such a manner that a trigger signal is generated when the ball passes through each of the areas. When the launched ball passes sequentially across each of the areas, a trigger signal is generated and only the image of the area through which the ball is passing is obtained. This method has the advantage that the size of the images that are photographed can be reduced by the number of the individual areas. Also, when the size of the image, that is to say, the total resolution of the image is reduced by excluding many parts other than the ball from the photographing range, it is possible to increase the photographing speed and to reduce the calculation processing time of the obtained image without reduction of the resolution of the golf ball image. Therefore, the specifications of the camera and communication/computing equipment can be reduced and cost for the equipment can be reduced. However, according to the above method, the area can be divided only in a direction perpendicular to the general direction in which the ball flies and cannot be divided in the direction in which the ball flies. For example, when the camera is arranged such that the ball flies from left to right in the total image capture area of the camera, vertically divided band-shaped image capture areas from the top end of the total image to the bottom end can be sequentially created. However, the image capture areas cannot be divided in the top to bottom direction. Also, the positions and sizes of the image capture areas must be determined in advance. Optimal image capture area division is different according to various flight conditions such as a low speed, high speed, low rotation, high rotation, etc., so that a complicated or compromising process of dividing and determining the image capture areas is performed. In addition, depending on the installation position of the camera and the location of the trigger lines, another object other than the ball (e.g., golf clubs, hitter's feet, passing insects, etc.) may cause a trigger of the camera.

Korean Patent No. 1244044, "a method for estimating a flight speed of a spherical object by using a stereo camera" is similar to the above-mentioned Korean Patent No. 1230613. However, according to Korean Patent No. 1244044, the trigger lines are created within the image acquisition camera without a separate trigger camera or device. When a passing ball is detected by the trigger line, the location of the passing ball on the trigger line is also detected and based on this position, a smaller image capture area which is divided in the top, bottom, right and left of the image of the ball is photographed. However, as with the Korean Patent No. 1230613, the location of the trigger line must be also determined in advance, and the trigger may occur when object other than the ball passes or moves over the trigger line.

SUMMARY

One embodiment is a device for measuring flight data of a flying object by using high speed image camera(s). The device includes: a launch signal generator which determines whether the flying object is launched or not and generates a signal when it is determined that the flying object is launched; a high speed image camera or cameras which photographs the flying object after the launch signal generator generates the signal; and a separate integrated processing device which controls the high speed image camera and calculates preliminary flight data and final flight data from images photographed by the high speed image camera. In the device for measuring the flight data of a flying object in accordance with the embodiment of the present disclosure, only the areas required to be photographed (i.e. a small area which includes the image of the ball) is defined as the primary image capture area and the second image capture area. Therefore, the size of the photographed image data is small and a large-capacity image data storage space is not required.

Another embodiment is a device for measuring a flight data of a flying object by using high speed image camera(s). The device includes: a launch signal generator which determines whether the flying object is launched or not and generates a signal when it is determined that the flying object is launched; and a first high speed image camera system which includes an integrated control unit and high speed image camera(s) which photographs the flying object after the launch signal generator generates the signal. The integrated control unit controls the high speed image cameras and calculates preliminary flight data and final flight data from images photographed by the high speed image camera. The device for measuring the flight data of a flying object in accordance with the embodiment of the present invention includes the integrated control unit, thereby providing the capability of controlling the high speed image camera and calculating the preliminary flight data and final flight data in accordance with the control unit's computing processing capability.

Another embodiment is a device for measuring flight data of a flying object by using a high speed image camera(s). The device includes: a launch signal generator which determines whether the flying object is launched or not and generates a signal when it is determined that the flying object is launched; a second high speed image camera system which includes a controller and high speed image camera(s) which photographs the flying object after the launch signal generator generates the signal; and a processing device which calculates final flight data from the images photographed by the high speed image camera. The controller controls the high speed image camera and calculates the preliminary flight data from the images photographed by the high speed image camera. In the device for measuring flight data of a flying object in accordance with the embodiment of the present invention, the controller calculates the preliminary flight data, and the processing device calculates the final flight data, so that computing processing can be performed more quickly.

The integrated processing device sets an area through which the flying object passes immediately after the launch of the flying object as the first image capture area, calculates the preliminary flight data from the images of the flying object photographed in the first image capture area, and sets a second image capture area by using the preliminary flight data. In the device for measuring flight data of a flying object in accordance with the embodiment of the present disclosure, the first image capture area is set such that the flying object must pass the first image capture area immediately after launch. Therefore, the flying object is not missed by the first capture area and the calculated preliminary flight data can be used to quickly calculate where to locate second image capture area.

The integrated control unit sets an area through which the flying object passes immediately after the launch of the flying object as the first image capture area, calculates the preliminary flight data from the images of the flying object photographed in the first image capture area, and sets a second image capture area by using the preliminary flight data.

The controller sets an area through which the flying object passes immediately after the launch of the flying object as the first image capture area, calculates the preliminary flight data from the images of the flying object photographed in the first image capture area, and sets a second image capture area by using the preliminary flight data.

The high speed image camera photographs the flying object once or more in the second image capture area, and the integrated processing device calculates the flight data of the flying object from the images of the flying object photographed in the first and/or second image capture areas. In the device for measuring a flight data of a flying object in accordance with the embodiment of the present disclosure, computing speed is improved because only small image capture areas that include the flying object are photographed to obtain the flight data instead of photographing the entire camera view area. The high speed image camera photographs the flying object once or more in the second image capture area, and the integrated processing device calculates the flight data of the flying object from the images of the flying object photographed in the first and/or second image capture areas. In the device for measuring flight data of a flying object in accordance with the embodiment of the present disclosure, the integrated control unit can also calculate the final flight data if it possesses sufficiently improved processing capabilities, thereby reducing the installation cost and improving computing speed.

The high speed image camera photographs the flying object once or more in the second image capture area, and the processing device calculates the flight data of the flying object from the images of the flying object photographed in the first and/or second image capture areas.

The preliminary flight data includes the flight speed and flight direction of the flying object, and the final flight data includes the flight speed, the flight direction, the rotational speed, and the rotation direction of the flying object. The device for measuring the flight data of a flying object in accordance with the embodiment of the present disclosure obtains various flight data, and thus, provides the user with more accurate flight information.

Any one of the preliminary flight data can be used as the final flight data (if the accuracy of the preliminary data is deemed sufficient). In the device for measuring flight data of a flying object in accordance with the embodiment of the present disclosure, the flight data of the flying object is calculated from the images photographed in the first and/or second image capture areas. Here, if at least any one of the preliminary flight data is used as the final flight data, the computing speed is improved, and thus, flight data can be obtained more quickly.

In an embodiment of the present disclosure, the launch signal generator uses a separate high speed launch detection camera to detect the instant of launch and generate a signal the instant it is determined that the flying object is launched. The device for measuring flight data of a flying object in accordance with the embodiment of the present disclosure uses the launch detection camera to determine whether or not the flying object is launched, so that the launched flying object is not missed in the first image capture area and the photographing can be effectively performed.

In an embodiment of the present disclosure, the launch signal generator uses the high speed image camera for photographing the ball to also detect the instant of launch and generate a signal when it is determined that the flying object is launched. The device for measuring flight data of a flying object in accordance with the embodiment of the present disclosure uses the high speed image camera to determine whether or not the flying object is launched, so that the launched flying object is not missed in the first image capture area and the photographing can be effectively performed An area where it is predicted that the flying object must pass through after it is launched from a stationary state is set as the first image capture area. In the device for measuring flight data of a flying object in accordance with the embodiment of the present disclosure, since the area covering the predicted initial flight direction of the flying object is set as the first image capture area, images of the flying object can be photographed without missing the flying object and the preliminary flight data can be obtained. The position through which the flying object passes after a predetermined time T elapses is estimated by using the preliminary flight data, and the second image capture area is set at this position. In the device for measuring flight data of a flying object in accordance with the embodiment of the present disclosure, the position of the flying object is estimated by using the preliminary flight data, and the second image capture area is set based on the position, so that only the small corresponding area needs to be photographed to obtain the image of the flying object after a time interval T. Therefore, it is not necessary to photograph the entire camera view area through which the flying object passes.

The photographing time T is specified in advance or is determined as a mathematical function of one or more of the preliminary flight data of the flying object. In the device for measuring flight data, since the photographing time is specified in advance or is calculated from the preliminary flight data, the position of the second image capture area can be simply set without the use of separate complex equipment. A photographing time for maximizing the accuracy of the flight information can be determined by various methods and standards.

Two or more photographing times can be specified in advance or calculated as a function of the preliminary flight data, so that image capture areas after the second or third image capture areas can be set. In the device for measuring flight data of a flying object in accordance with the embodiment of the present disclosure, since the second, third or later image capture area can be set by specifying two or more photographing times, the flying object can be photographed in many areas and the final flight data can be calculated by using the captured photographs. Therefore, more accurate flight information can be obtained.

Yet another embodiment is a method for measuring flight data of a flying object by using the high speed image cameras of the previous embodiments. The method includes: a first setting step in which an area through which the flying object passes immediately after launch of the flying object is set as the first image capture area; a first photographing step in which photographing is performed once or more in the first image capture area by using the high speed image camera; a preliminary calculation step in which the preliminary flight data of the flying object is calculated from the images photographed in the first photographing step; a second setting step in which a second image capture area is set by using the preliminary flight data; a second photographing step in which the photographing is performed once or more in the second image capture area by using the high speed image camera; and a flight data calculation step in which the final flight data of the flying object is calculated from the images photographed in the first and/or second photographing steps. In the method for measuring the flight data of the flying object in accordance with the embodiment of the present disclosure, the photographing is performed only in the small areas that are only large enough to capture the image of the flying object in the first photographing step and the second photographing step. Therefore, the size of the photographed image data is small and a large-capacity image data storage space is not required.

At least one of the preliminary flight data calculated in the preliminary calculation step can be used as the final flight data in the flight data calculation step. In the method for measuring flight data of a flying object in accordance with the embodiment of the present disclosure, the final flight data of the flying object is calculated in the flight data calculation step from the images photographed in the first and/or second photographing steps. Here, if at least one of the preliminary flight data is used as the final flight data in the flight data calculation step, the computing speed is improved, and thus, flight data can be obtained more quickly.

A launch detection step is further included. The launch detection step detects the instant of launch of the flying object by using a launch detection camera before the first photographing step. In the method for measuring flight data of a flying object in accordance with the embodiment of the present disclosure, since the launch detection camera is used separately, there is no need to detect the launch by using the high speed image camera. Therefore, a control circuit design of the high speed image camera becomes simpler, a launch detection speed is fast and launch detection is accurate.

A launch detection step is further included. The launch detection step detects the launch of the flying object by using the high speed image cameras before the first photographing step. In the method for measuring a flight data of a flying object in accordance with the embodiment of the present disclosure, since the launch is detected by using the high speed image camera, there is no need to install a separate launch detection camera, so that it is possible to make it easier to design and possible to reduce the manufacturing cost.

The preliminary flight data includes the flight speed and the flight direction of the flying object, and the final flight data includes the flight speed, the flight direction, the rotational speed, and the rotation direction of the flying object. Since the flying object of the golf ball can be assumed to perform a rectilinear motion after the launch thereof, the position through which the flying object passes at a given point of time can be calculated by using the flight speed and flight direction data among the preliminary flight data. The preliminary flight data of the flying object of the embodiment of the present disclosure can be calculated very quickly by using an FPGA or the arithmetic processing unit of the camera control system. Therefore, the preliminary flight data can be calculated in real time during the flight of the flying object.

In the first setting step, an area where it is predicted that the flying object must pass through after it is launched from a stationary state is set as the first image capture area. In the method for measuring flight data of a flying object in accordance with the embodiment of the present disclosure, since the area covering the predicted initial flight direction of the flying object is set as the first image capture area, images of the flying object can be photographed without missing the flying object and the preliminary flight data can be obtained. In the second setting step, a position through which the flying object passes at the point in time when a predetermined photographing time T elapses is estimated by using the preliminary flight data, and, the second image capture area is set to include this position. In the method for measuring flight data of a flying object in accordance with the embodiment of the present disclosure, the position of the flying object after a predetermined time T has elapsed is estimated by using the preliminary flight data, and the second image capture area is set to include the position, so that only the corresponding area is photographed. Therefore, it is not necessary to photograph the entire camera view area through which the flying object passes.

The photographing time T is specified in advance or is calculated as a mathematical function of one or more of the preliminary flight data of the flying object. In the method for measuring flight data of a flying object in accordance with the embodiment of the present disclosure, a predetermined photographing time T is required in order to set the position of the second image capture area. Since the photographing time is specified in advance or is calculated from the preliminary flight data, the position of the second image capture area can be simply set without complex equipment. A photographing time for maximizing the accuracy of the flight information can be determined by various methods and standards.

In the second setting step, two or more predetermined photographing times can be specified in advance or can be specified as functions of the preliminary flight data, so that image capture areas after the second or third image capture areas is set. In the method for measuring flight data of a flying object in accordance with the embodiment of the present disclosure, since the second, third or later image capture areas can be set by determining two or more photographing times, the flying object can be photographed in each image capture area and the final flight data can be calculated by using the photographs. Therefore, more accurate flight information can be obtained.

A computer-readable recording medium having a program for performing the method for measuring a flight data of a flying object in accordance with the embodiment of the present invention is included.

BRIEF DESCRIPTION OF THE DRAWINGS

FIG. 1 is a block diagram of a system for measuring a flight data of a flying object by using a high speed image camera in accordance with a first embodiment of the present disclosure;

FIG. 2 is a block diagram of a system for measuring the flight data of the flying object by using the high speed image camera in accordance with a second embodiment of the present disclosure;

FIG. 3 is a block diagram of a system for measuring the flight data of the flying object by using the high speed image camera in accordance with a third embodiment of the present disclosure;

FIG. 4 is a view showing main components and an installation example of them when the embodiment of the present disclosure is applied to an indoor golf simulation facility;

FIG. 5 is a flowchart for measuring the flight data of a flying object by using the high speed image camera in accordance with embodiments of the present disclosure;

FIG. 6 is a view showing a first image capture area according to the embodiments of the present disclosure;

FIG. 7 is a view showing the flying object being photographed once or more in the first image capture area according to the embodiments of the present disclosure;

FIG. 8 is a view showing an example of setting a second image capture area from an image photographed in a first photographing step according to the embodiments of the present disclosure;

FIG. 9 is a flowchart showing that a launch detection step is further included, which detects whether the flying object is launched or not by using a launch detection camera before the first photographing step; and FIG. 10 is a view showing that an image capture area after the second or third image capture area is set by specifying two or more photographing times.

DETAILED DESCRIPTION

Embodiments of the present disclosure will be described in more detail with reference to the accompanying drawings. In the components of the present invention, detailed descriptions of what can be clearly understood and easily carried into practice through prior art by those skilled in the art will be omitted to avoid making the subject matter of the present invention unclear.

The embodiment of the present disclosure can be used to measure flight data of a baseball that is an example of a flying object. Also, the embodiment of the present disclosure can be applied to a case where one or multiple high speed image cameras are used in order to obtain the flight data of the flying object. For a specific example of the embodiment of the present disclosure, a device and method for measuring the flight data of a golf ball that is an example of the flying object in an indoor golf simulation facility by using a pair of high speed image cameras, and a computer-readable recording medium having a program for performing the same will be described.

FIG. 1 is a block diagram of a system for measuring the flight data of a flying object by using a high speed image camera in accordance with a first embodiment of the present disclosure. FIG. 2 is a block diagram of a system for measuring the flight data of a flying object by using the high speed image camera in accordance with a second embodiment of the present disclosure. FIG. 3 is a block diagram of a system for measuring the flight data of a flying object by using the high speed image camera in accordance with a third embodiment of the present disclosure. FIG. 4 is a view showing main components and an installation example of them when the embodiment of the present invention is applied to an indoor golf simulation facility.

Referring to FIGS. 1 and 4, the system for measuring the flight data of the golf ball by using high speed image cameras 220 and 230 in accordance with the first embodiment of the present disclosure includes a launch signal generator 100, the high speed image cameras 220 and 230, and an integrated processing device 300. Referring to FIGS. 2 and 4, the system for measuring the flight data of the golf ball by using the high speed image cameras 220 and 230 in accordance with the second embodiment of the present disclosure includes a first high speed image camera system 200 including the launch signal generator 100, the high speed image cameras 220 and 230, and an integrated control unit 210. Referring to FIGS. 3 and 4, the system for measuring the flight data of the golf ball by using the high speed image camera in accordance with the third embodiment of the present invention includes a processing device 305 and a second high speed image camera system 2200 including the launch signal generator 100, the high speed image cameras 220 and 230, and a controller 215.

The launch signal generator 100 determines whether the golf ball 700 is launched or not. When the golf ball is launched, the launch signal generator 100 generates a signal. In one embodiment, the launch signal generator 100 detects whether the golf ball 700 is launched or not, and the launch signal generator 100 generates a signal, at the moment when the golf ball is launched or within a short period of time immediately after the golf ball is launched.

According to the embodiments of the present disclosure, a means for determining whether the golf ball 700 is launched or not may be selected from among many devices which are used in existing commercial systems. When an initial position where the golf ball is placed is fixed, an LED sensor, laser sensor or line scan camera may be installed under or in front of the golf ball. When the golf ball may be placed in any position, a separate camera can be used. When a separate camera is used, it is not necessary for the camera to photograph the flight of the launched golf ball. Therefore a camera of the same kind as the high speed image cameras 220 and 230 or a camera having a slightly lower resolution can be used. Alternatively, the camera can be made to perform the function of detecting the launch of the golf ball by modifying the control circuitry of the camera.

According to the embodiment of the present disclosure, instead of using a separate launch detection sensor device, one of the high speed image cameras 220 and 230 installed for the purpose of photographing the golf ball can be used to detect whether the golf ball is launched or not. In this case, one of the high speed image cameras 220 and 230 can continuously monitor whether the golf ball is launched or not, and when launch is detected, the camera can immediately switch to capturing the 3D image of the golf ball in flight.

According to the embodiment of the present disclosure, in the case when either a separate camera is used, or one of the high speed image cameras 220 and 230 is used, the launch of the golf ball can be detected by continuously scanning at high frequency, a small area immediately in front of the ball where the ball must pass when launched, or a small area on the golf ball itself. When the golf ball is launched as passes the scanning area in front of the ball, or disappears from the scanning area on the ball, the launch signal can be generated.

According to the embodiment of the present disclosure, a launch detection camera 110 is separately installed, thereby detecting whether the golf ball is launched or not. The launch detection camera 110 can be positioned at any position capable of detecting whether the golf ball is launched or not. No matter where the launch detection camera 110 is positioned, the embodiment of the present disclosure can be carried out if the position is capable of recognizing the initial position area in which the flying object may be placed and the scanning area 40 which detects whether the flying object is launched or not.

Referring to FIGS. 1, 2, and 3, according to the embodiment of the present disclosure, in order to obtain more accurate flight data, the image of the flying object during flight can be photographed by installing two or more high speed image cameras 220 and 230. In the embodiment of the present disclosure shown in FIG. 1, the integrated processing device 300 controls the high speed image cameras 220 and 230 and calculates the preliminary flight data and final flight data from the photographed images. In the embodiment of the present disclosure shown in FIG. 2, the integrated control unit 210 of the first high speed image camera system 200 controls the high speed image cameras 220 and 230 and can calculate the preliminary flight data and final flight data from the photographed images. In the embodiment of the present disclosure shown in FIG. 3, the controller 215 of the second high speed image camera system 2200 controls the high speed image cameras 220 and 230 and calculates the preliminary flight data from the photographed images of the first image capture area. The processing device 305 calculates the final flight data from the photographed images of all the image capture areas.

The high speed image cameras 220 and 230 possess the function of being able to designate a small image capture area at any desired location and size within the total camera view area 10 and of photographing the designated image capture area. After the launch signal generator 100 generates the signal, the high speed image cameras 220 and 230 may photograph the flying object. According to the embodiment of the present disclosure, the image sensors for the high speed image cameras 220 and 230 can be selected from among many sensors on the market. In particular, CMOS-based sensors have such functions, and the smaller the image capture area is designated, the faster the camera can take high speed continuous photographs. According to the embodiment of the present disclosure, the high speed image cameras 220 and 230 may photograph the flying object once or more in the first image capture area 20 and may also photograph the flying object once or more in the second image capture area 30. A large-capacity data storage space is not required and computing speed is improved because only partial areas necessary to obtain the flight data are photographed instead of photographing the entire camera view area through which the flying object flies. The area through which the flying object passes immediately after the launch of the flying object is set as the first image capture area 20. According to the embodiment of the present disclosure, the area in the path of the predicted flight direction of the flying object launched from a stationary state is set as the first image capture area 20. Since the area in the path of the predicted flight direction of the flying object is set as the first image capture area 20, preliminary flight data can be obtained by photographing the flying object without the possibility of the flying object missing the image capture area. The second image capture area 30 can be set by using the preliminary flight data.

According to the embodiment of the present disclosure, when the high speed image cameras 220 and 230 receive the launch signal generated by the launch signal generator 100 comprised for example of the launch detection camera 110, the high speed image cameras 220 and 230 photograph the flying golf ball and the photographed images are transmitted to the integrated processing device 300, the integrated control unit 210 or the controller 215 in a manner described below.

The integrated control unit 210 can control the high speed image cameras 220 and 230 and can calculate the preliminary flight data and final flight data from the images photographed by the high speed image cameras 220 and 230. The preliminary flight data may include the flight speed and flight direction of the flying object, and the final flight data may include the flight speed, flight direction, rotational speed, rotation direction, etc. The device for measuring the flight data of the flying object in accordance with the embodiment of the present invention is able to obtain various flight data, and thus, to provide the user with more accurate flight information.

The integrated control unit 210 can calculate the preliminary flight data from the images of the flying object photographed in the first image capture area 20 and can set the second image capture area 30 by using the preliminary flight data. A position through which the flying object passes at a point of time when a predetermined photographing time T elapses is estimated by using the preliminary flight data. On the basis of the position, the second image capture area 30 is set. The device for measuring the flight data in accordance with the embodiment of the present disclosure does not need to photograph the entire area through which the flying object passes because the device sets the image capture area and photographs only the corresponding area. Here, the photographing time T may be specified in advance or may be defined as a mathematical function the preliminary flight data of the flying object. Since the photographing time is specified in advance or is calculated from the preliminary flight data, the position of the second image capture area 30 can be simply set without separate complex equipment. A photographing time for maximizing the accuracy of the flight information may be determined by various methods and standards. Also, two or more photographing times can be specified in advance or calculated from the preliminary flight data, so that image capture areas after the second or third image capture areas can be set. Since the second, third or later image capture areas can be set by specifying two or more photographing times, the flying object can be photographed in each image capture area and the flight data can be calculated by using the photographs. Therefore, more accurate flight information can be obtained.

The integrated control unit 210 can analyze the images photographed in the first image capture area 20, and then calculate the preliminary flight data such as the flight speed and flight direction of the golf ball. This can be performed by using an FPGA or the arithmetic processing unit of the integrated control unit 210. Since the calculated flight speed, flight direction, etc., are used to calculate the position of the next image capture areas, they only need to be accurate enough such that the golf ball is positioned within the boundaries of the next image capture areas.

Also, the integrated control unit 210 may calculate the final flight data from the images of the flying object photographed in the first and/or second image capture areas 20 and 30. Sufficiently powerful computing processing capability can allow the integrated control unit 210 to calculate the final flight data, thereby reducing installation cost and improving the computing speed. Any of the preliminary flight data calculated by the integrated control unit 210 can be used as the final flight data if it is deemed accurate enough. When at least any one of the preliminary flight data is used as the flight data, the computing speed is improved, and thus, flight data can be obtained more quickly.

The integrated processing device 300 can control the high speed image cameras 220 and 230 and calculate the preliminary flight data and final flight data of the golf ball by using the photographed images of the golf ball received from the high speed image cameras 220 and 230. The preliminary flight data may include the flight speed and flight direction of the flying object, and the flight data may include the flight speed, flight direction, rotational speed, rotation direction, etc. The integrated processing device 300 is generally composed of a PC. However, the integrated processing device 300 is not necessarily limited to this. Any device capable of calculating the preliminary flight data and flight data by using the photographed images of the flying object can be used as the integrated processing device 300. That is, the integrated processing device 300 is not necessarily composed of a separate device such as a PC, and may be included in the first high speed image camera system 200 by including a computing board in the integrated control unit 210 or by including the computing processing function in a circuit.

The integrated processing device 300 can calculate the preliminary flight data from the image of the flying object photographed in the first image capture area 20 and can set the second image capture area 30 by using the preliminary flight data. A position through which the flying object passes at a point in time when a predetermined photographing time T elapses is estimated by using the preliminary flight data. On the basis of the position, the second image capture area 30 is set. Here, the photographing time T may be specified in advance or may be calculated as a function of the preliminary flight data of the flying object. Also, two or more photographing times can be specified in advance or calculated as functions of the preliminary flight data, so that image capture areas after the second or third image capture areas can be set.

The integrated processing device 300 can analyze the images photographed in the first image capture area 20, and then calculate the preliminary flight data such as the flight speed and flight direction of the golf ball. This can be performed by installing and utilizing the functions of the FPGA or arithmetic processing unit of the integrated control unit 210 in the integrated processing device 300. The calculated flight speed, flight direction, etc., are used to calculate the position of the next image capture areas.

Also, the integrated processing device 300 can calculate the final flight data from the images of the flying object photographed in the first and/or second image capture areas 20 and 30. One or more of the preliminary flight data calculated by the integrated processing device 300 can also be used as the final flight data.

The controller 215 can control the high speed image cameras 220 and 230 and calculate the preliminary flight data from the images photographed by the high speed image cameras 220 and 230. The processing device 305 can calculate the flight data from the photographed images. The preliminary flight data may include the flight speed and flight direction of the flying object, and the flight data may include the flight speed, flight direction, rotational speed, rotation direction, etc. The processing device 305 is generally composed of a PC. However, the processing device 305 is not necessarily limited to this. Any device capable of calculating the flight data by using the photographed images of the flying object can be used as the processing device 305.

The controller 215 may calculate the preliminary flight data from the image of the flying object photographed in the first image capture area 20 and may set the second image capture area 30 by using the preliminary flight data. A position through which the flying object passes at a point in time when a predetermined photographing time T elapses is estimated by using the preliminary flight data. On the basis of the position, the second image capture area 30 is set. Here, the photographing time T may be specified in advance or may be calculated as a function of the preliminary flight data of the flying object. Also, two or more photographing times can be specified in advance or calculated as functions of the calculation from the preliminary flight data, so that an image capture area after the second or third image capture area can be set.

The controller 215 can analyze the images photographed in the first image capture area 20, and then calculate the preliminary flight data such as the flight speed and flight direction of the golf ball. This can be performed by using an FPGA or the arithmetic processing unit of the controller 215. The calculated flight speed, flight direction, etc., are used to calculate the position of the next image capture areas.

The processing device 305 may calculate the final flight data from the images of the flying object photographed in the first and/or second image capture areas 20 and 30. One or more of the preliminary flight data calculated by the controller 215 can be used as the final flight data. When at least any one of the preliminary flight data is used as the final flight data, the computing speed is improved, and thus, flight data can be obtained more quickly.

According to the embodiment of the present disclosure, the flight data of the golf ball as the flying object, that is to say, the flight speed, flight direction, rotational speed, rotation direction, etc., may be calculated by well-known various methods. For example, as a method for calculating the rotation amount of the golf ball, the golf ball can be marked with a pattern and the movement of the markings can be calculated from the sequentially photographed images. Then, the rotation amount can be calculated based on the amount and direction the markings moved in a known time interval. Also, there is a method in which the arrangement of the dimples of the golf ball is analyzed by an image processing method without marking the golf ball separately and the change of the dimple arrangement is recognized, so that the rotation amount and rotational direction can be calculated. Such calculation methods will not be described separately in the embodiment of the present invention.

FIG. 4 shows a beam projector 400 and a screen 500 which show an image of a golf ball flying in an indoor golf simulation facility in accordance with the embodiment of the present invention.

According to the embodiment of the present disclosure, the positions of the high speed image cameras 220 and 230 and the launch detection camera 110 may be changed. The camera lens of the high speed image cameras 220 and 230 can be installed to face in the horizontal direction in order to photograph the flight image of the golf ball or they can be installed to face in the vertical direction in some cases. The launch detection camera 110 is installed close to the stationary golf ball because the launch detection camera 110 detects whether the golf ball is launched or not in one embodiment. However, the launch detection camera 110 is not necessarily installed close to the golf ball and may be installed in any position capable of detecting whether the golf ball is launched or not. No matter where the launch detection camera 110 is positioned, the embodiment of the present disclosure can be carried out if the position is capable of recognizing an initial position area in which the flying object may be placed before the launch and the scanning area 40 which detects whether the flying object is launched or not.

FIG. 5 is a flowchart for measuring the flight data of a flying object by using the high speed image cameras 220 and 230 in accordance with embodiments of the present disclosure. Referring to FIG. 5, according to the embodiment of the present disclosure, the method for measuring the flight data of the flying object by using the high speed image cameras 220 and 230 includes a first setting step S10, a first photographing step S20, a preliminary calculation step S30, a second setting step S40, a second photographing step S50, and a flight data calculation step S60. The area through which the golf ball that is an example of the flying object must pass is set as the first image capture area 20 in the first setting step S10. Then, the golf ball passing through the first image capture area 20 is photographed once or more by using the high speed image cameras 220 and 230 in the first photographing step S20. In the preliminary calculation step S30, the preliminary flight data of the flying object is calculated from the image photographed in the first photographing step S20. Subsequently, in the second setting step S40, the second image capture area 30 is set by using the preliminary flight data calculated in the previous step. Then, the golf ball passing through the second image capture area 30 is photographed once or more by using the high speed image cameras 220 and 230 in the second photographing step S50. Then, in the flight data calculation step S60, the flight data of the golf ball is calculated from the images photographed in the first and/or second photographing steps S20 and S50. The flight data of the golf ball is calculated by the following manner.

(1) First Setting Step S10

According to the embodiment of the present disclosure, the area through which the flying object must pass after the launch of the flying object is set as the first image capture area 20 in the first setting step S10. FIG. 6 is a view showing the first image capture area 20 according to the embodiments of the present disclosure. The first image capture area 20 may be set in various ways according to the embodiment of the present disclosure.

According to the embodiment of the present disclosure, in the first setting step S10, an area where it is predicted that the flying object must pass through after it is launched from a stationary state is set as the first image capture area 20. Since the area covering the predicted initial flight direction 50 of the flying object is set as the first image capture area 20, images of the flying object can be photographed without missing the flying object and the preliminary flight data can be obtained. According to the embodiment of the present disclosure, an area immediately in front of the flying object can be set as the area of the planned flight direction.

According to the embodiment of the present disclosure, instead of the area immediately before the flying object, an area which includes all or part of the stationary flying object can be set as the first image capture area 20. When the flying object in a stationary state is launched, the launch signal generator 100 transmits the launch signal to the high speed image cameras 220 and 230. As long as the high speed image cameras 220 and 230 are able to photograph the flying object once or more in the first image capture area 20 it does not matter whether the image of the stationary frying object is included in the first image capture area 20.

According to the embodiment of the present disclosure, the first image capture area 20 can be set in front of the stationary flying object a certain distance apart of the object rather than the area immediately in front of the flying object as long as the flying object can be photographed.

According to the embodiment of the present disclosure, when the area through which the flying object passes is set as the first image capture area 20, the size of the first image capture area 20 is determined in consideration of the flight speed, flight direction, etc., of the golf ball such that the golf ball can be photographed.

According to the embodiment of the present disclosure, if the size of the total camera view area 10 of the high speed image cameras 220 and 230 is approximately calculated simply in two dimensions assuming that a 1.5 Mpixel sensor (1280×1024 resolution) is used, and the high speed image camera lens is selected such that the resolution is 14 pixels per 1 Cm, the diameter length of the golf ball has a resolution of about 60 pixels. This resolution is enough to recognize the marking of the golf ball and to calculate the rotation. Here, the size of the total camera view area 10 that can be photographed by the high speed image cameras 220 and 230 is about 910×730 mm. This size is sufficient for the flight data of the flying golf ball, that is to say, the flight speed, flight direction, etc., to be accurately calculated.

According to the embodiment of the present disclosure, when the size of the first image capture area 20 is set to 320×240 pixels, about five golf balls and four golf balls wide in the horizontal direction and vertical direction respectively. In order to photograph the golf ball more than twice within the first image capture area 20 when the ball is travelling at maximum speed (about 90 m/s), a photographing speed greater than about 500 fps (frame per second) is required. In order to measure the maximum number of rotations (about 10,000 rpm) by using the high speed image cameras 220 and 230, the golf ball must be photographed more than twice or three times before a marking on the surface of the golf ball rotates to the other side out of the sight of the camera. For example, when continuous photographing is performed on a golf ball rotating at 10,000 rpm at the speed of 1,000 fps, the amount that the ball rotates between frame is about 60 degrees. In this case, photographing can be performed three times before the golf ball rotates by 180 degrees. Therefore, when the continuous photographing speed of the high speed image cameras 220 and 230 is greater than 1,000 fps, the golf ball rotating at the maximum rotational speed and travelling at the maximum flight speed can be photographed at least twice to three times in the first image capture area.

Among image camera sensors which are currently sold in the market, there is already camera image sensors available which, as described above, is capable of continuously photographing with a 320×240 resolution at a photographing speed greater than 1,000 fps, has a total resolution of greater than 1.5 Mpixel, and is capable of freely setting the image capture area. Such image camera sensors are being used in many current image camera products. Therefore, the embodiments of the present disclosure can be sufficiently implemented by using commercial products which are currently available.

(2) First Photographing Step S20

According to the embodiment of the present disclosure, in the first photographing step S20, the photographing is performed once or more in the first image capture area 20 by using the high speed image cameras 220 and 230. FIG. 7 is a view showing the flying object being photographed once or more in the first image capture area 20. FIG. 7 shows an overlapped view of two images photographed in the first image capture area 20 by one of two high speed image cameras 220 and 230. Similar images will be captured by the other high speed image camera to provide a stereoscopic image set. Three-dimensional flight data information can be obtained through the combined images photographed by the two high speed image cameras 220 and 230.

According to the embodiment of the present disclosure, the golf ball can be photographed only once in the first image capture area 20. When the golf ball is photographed once, the flight speed, flight direction, etc., are calculated by comparing the photographed image of the launched golf ball with the image of the golf ball placed at the initial position before the launch. In this case, the calculation value may be somewhat inaccurate due to physical phenomena such as the compression and expansion of the golf ball at the moment when a golf club meets the golf ball, slipping of the golf ball, etc.

According to the embodiment of the present invention, when the golf ball is photographed more than twice, the images of the golf ball in flight after being launched are acquired such that the preliminary flight data can be more accurately calculated. Therefore, according to the embodiment of the present invention, the photographing can be performed in a variety of ways once or more in the first photographing step S20.

(3) Preliminary Calculation Step S30

According to the embodiment of the present disclosure, in the preliminary calculation step S30, the preliminary flight data of the flying object is calculated from the images photographed in the first photographing step S20. Here, the preliminary flight data may be defined as "data calculated from the images photographed in the first photographing step S20 in order to calculate the position through which the flying object passes after a predetermined photographing time T has elapsed."

According to the embodiment of the present disclosure, the integrated control unit 210, the integrated processing device 300, and the controller 215 analyze the image photographed in the first image capture area 20 and calculate the preliminary flight data such as the flight speed, flight direction, etc., of the golf ball. This can be performed by using an FPGA or an arithmetic processing unit of the integrated control unit 210, the integrated processing device 300, and/or the controller 215. Since the calculated flight speed, flight direction, etc., are used to calculate the position of the next image capture areas, the preliminary data need only to be accurate enough for the ball to be positioned within the boundary of the next image capture areas at the specified time. Also, at least one of the preliminary flight data calculated in the preliminary calculation step S30 can be used as the final flight data of the flight data calculation step S60. In the flight data calculation step S60, the final flight data of the flying object is calculated from the images photographed in the first and/or second photographing steps S20 and S50. Here, when at least one of the preliminary flight data is used as the final flight data of the flight data calculation step S60, the computing speed is improved, and thus, flight data can be obtained more quickly.

(4) Second Setting Step S40

According to the embodiment of the present disclosure, in the second setting step S40, the second image capture area 30 is set by using the preliminary flight data. FIG. 8 is a view showing an example of setting the second image capture area 30 from the image photographed in the first photographing step S20 according to the embodiments of the present invention.

According to the embodiment of the present disclosure, the position through which the golf ball passes at a specified photographing time (i.e., the photographing time which has been specified in advance or calculated as a function of the preliminary flight data) is calculated as follows. In the embodiment of the present disclosure, it is assumed that the golf ball flies in a straight line and at a uniform speed in the total image capture area 10. The speed in the X direction and the speed in the Y direction of the golf ball are $Vx=(x2-x1)/\Delta t1$ and $Vy=(y2-y1)/\Delta t1$ respectively.

Here, $\Delta t1$ represents a time interval at which the golf ball is continuously photographed. If the set photographing time T is later than the initial photographing time of the first image capture area 20 by $\Delta t2$, the position through which the golf ball passes at this time is $X3=x1+Vx\times\Delta t2$ and $Y3=y1+Vy\times\Delta t2$.

Therefore, the second image capture area 30 shows an area having a size of 320×240 pixel with the points X3 and Y3 as its center point. This is set as the second image capture area 30, and when $\Delta t2$ elapses, the high speed image cameras 220 and 230 photograph the second image capture area 30, and therefore the image of the flying golf ball can be obtained. The size of the second image capture area 30 may be changed depending on how accurately the preliminary flight data is calculated.

According to the embodiment of the present disclosure, the position of the second image capture area 30 can be calculated by using other methods. On the basis of the position of the second image capture area 30, the second image capture area 30 may be set to have various pixel sizes. This is included in the second setting step S40 of the embodiment of the present disclosure.

(5) Second Photographing Step S50

According to the embodiment of the present disclosure, in the second photographing step S50, the photographing is performed once or more in the second image capture area 30 by using the high speed image cameras 220 and 230 at a the instant the time period Δt2 has elapsed from the initial photographing time in the first image capture area 20. The photographing may be performed in the same manner as that of the first photographing step S20.

(6) Flight Data Calculation Step S60

According to the embodiment of the present disclosure, in the flight data calculation step S60, the final flight data of the flying object is calculated more accurately by using the images that the integrated control unit 210, the integrated processing device 300, and the processing device 305 has photographed in the first and/or second photographing steps S20 and S50. According to the embodiment of the present disclosure, the flight data of the golf ball as the flying object, that is to say, the flight speed, flight direction, rotational speed, rotation direction, etc., may be calculated by well-known various methods.

According to the embodiment of the present disclosure, the images obtained by photographing multiple frames at a high speed in the first image capture area 20 may be used later by the integrated control unit 210, the integrated processing device 300, and the processing device 305 to accurately calculate the rotational speed, etc. of the golf ball. Theoretically, the flight speed, flight direction, etc., of the golf ball can be also calculated. However, when the flight data is calculated only by the images obtained in the first image capture area 20, position errors of the golf ball have relatively large influence on the calculation of the flight speed, flight direction, etc., because the flight speed, flight direction, etc., are calculated in a small area. When the golf ball has a high rotation speed, accurate flight data can be obtained by photographing at a high speed. However, if the golf ball is rotating at a low speed and photographing is carried out in high speed, the position error of the marking has a large influence on the accuracy of the calculation of the rotation because the movement of the markings on the golf ball are small between the frames. In order to solve such problems, the golf ball can be additionally photographed after a sufficient amount of time as pass after the golf ball passes through the first image capture area 20 and the position of the golf ball is a little farther Accordingly, more accurate calculations of the golf ball flight speed, flight direction, etc. can be obtained and more accurate rotational data can be obtained when the golf ball is rotating at low speeds.

In the method for measuring the flight data of a flying object in accordance with the embodiment of the present disclosure, the photographing is performed only on the small area required in the first photographing step S20 and the second photographing step S50. Therefore, the size of the photographed image data is small and a large-capacity image data storage space is not required.

According to the embodiment of the present disclosure, one or more of the preliminary flight data calculated in the preliminary calculation step S30 can be used as the final flight data normally obtained in the flight data calculation step S60. In the flight data calculation step S60, the final flight data of the flying object is calculated from the images photographed in the first and/or second photographing steps S20 and S50. Here, if one or more of the preliminary flight data is used as the final flight data of the flight data calculation step S60, the computing speed is improved, and thus, flight data can be obtained more quickly.

FIG. 9 is a flowchart showing the launch detection step S05, which detects whether the flying object is launched or not by using the launch detection camera 110 before the first photographing step S20 in accordance with the embodiments of the present disclosure to measure the flight data of a flying object by using the high speed image cameras 220 and 230.

The embodiment of the present disclosure further includes the launch detection step S05 before the first photographing step S20. In the launch detection step S05, the launch of the flying object is detected by using the launch detection camera 110 before the first photographing step S20. Such a method for measuring the flight data of the flying object in accordance with the embodiment of the present disclosure uses the launch detection camera 110 separately. Therefore, there is no requirement for the camera to be used for the purpose of obtaining a three-dimensional image while detecting the launch of the flying object by using the high speed image cameras 220 and 230.

According to the embodiment of the present disclosure, the launch detection camera 110 is only required to observe the area in which the flying object can be initially placed without being required to photograph the flying object image. Therefore, a camera which has a resolution that is the same as or lower than that of the high speed image cameras 220 and 230 can be used as the launch detection camera 110.

According to the embodiment of the present disclosure, the launch detection camera 110 can be positioned at any position capable of detecting whether the golf ball is launched or not. No matter where the launch detection camera 110 is positioned, the embodiment of the present disclosure can be carried out if the position is capable of recognizing the scanning area 40 which detects whether the flying object is launched or not.

According to the embodiment of the present disclosure, when the golf ball is placed at the initial position and the first image capture area 20 is set, the launch detection camera 110 monitors a small area of the golf ball or a small area just in front of the golf ball at a ultra-high speed. When a change greater than a certain value occurs in the monitored area, the launch detection camera 110 generates the launch signal and transmits to the high speed image cameras 220 and 230.

When the high speed image cameras 220 and 230 receives the launch signal, the high speed image cameras 220 and 230 photograph continuously the first image capture area 20 once or more at a predetermined photographing speed (e.g., 1,000 fps).

According to the embodiment of the present disclosure, in the launch detection step, the launch of the flying object can be detected by using one of the high speed image cameras 220 and 230 without the use of a separate launch detection camera 110. Such a method for measuring the flight data of the flying object in accordance with the embodiment of the present disclosure detects the launch by using one of the high speed image cameras 220 and 230. Therefore, there is no necessity to install a separate launch detection camera 110, so that it is possible to make it easier to design and possible to reduce the manufacturing cost. In this case, it is necessary to use one of the high speed image cameras 220 and 230 to detect launch, and to change the mode of the camera to carry out 3D photographing of the flying object immediately after launch is detected.

According to the embodiment of the present disclosure, the preliminary flight data includes the flight speed and flight direction of the flying object, and the final flight data includes the flight speed, flight direction, rotational speed, rotation direction, etc. Since the flying object or the golf ball can be assumed to perform a rectilinear motion after the launch thereof, the position through which the flying object passes at a given point of time can be calculated by only obtaining the flight speed and flight direction among the preliminary flight data. The preliminary flight data of the flying object of the embodiment of the present invention can be calculated very quickly by using an FPGA or an arithmetic processing unit of the camera control system. Therefore, the preliminary flight data can be calculated in real time during the flight of the flying object.

According to the embodiment of the present disclosure, the preliminary flight data can be calculated by the integrated control unit 210, the integrated processing device 300, and the controller 215.

According to the embodiment of the present disclosure, in the second setting step S40, the position through which the flying object passes after a predetermined time T elapses is estimated by using the preliminary flight data, and the second image capture area 30 is set at this position. In the method for measuring flight data of a flying object in accordance with the embodiment of the present disclosure, the position of the flying object is estimated by using the preliminary flight data, and the second image capture area 30 is set based on the position, so that only the small corresponding area need to be photographed to obtain the image of the flying object after a time interval T. Therefore, it is not necessary to photograph the entire camera view area through which the flying object passes.

According to the embodiment of the present disclosure, the photographing time T is specified in advance or is determined as a mathematical function of one or more of the preliminary flight data of the flying object.

According to the embodiment of the present disclosure, as a method of specifying the photographing time T in advance, the user can input the value(s) to the integrated control unit 210, the integrated processing device 300, and the controller 215. The photographing variables such as the photographing time T, how many times the continuous photographing is performed, etc., should be determined such that the flight images enabling the most accurate calculation of the flight data can be obtained. If the flight data has a large range, the photographing time T is compromisingly determined in many cases. In the case where the photographing time T is determined so that a golf ball hit at a high speed by a driver does not pass the boundaries of the total camera view, large errors can occur in the calculation of the flight speed and flight direction of the golf ball when the golf ball is hit at a low speed because of its small travel distance. One method for overcoming such a problem is to set an additional image capture area so that additional photographs of the golf ball traveling at a low speed can be taken after it travels a sufficient distance. In addition to this method, the photographing time T may be flexibly specified according to the purpose of the user.

According to the embodiment of the present disclosure, when the photographing time T is determined as a function of the preliminary flight data, the photographing time T can be variably determined according to the flight situation of the flying object. In the case of the golf ball, the photographing time T can be determined by a simple equation, i.e., $T=S/V$ (V is the flight speed of the golf ball among the preliminary flight data), such that according to the speed of the golf ball, the golf ball is photographed when it travels the maximum distance (S) without crossing the boundaries of the total camera view area. In this case, when the golf ball flies the distance S after launch photographing is performed regardless of the speed of the golf ball. In addition to this method, the photographing time T may be determined by various calculation methods according to the purpose of the user.

In the method for measuring the flight data of a flying object in accordance with the embodiment of the present disclosure, a predetermined photographing time T is required in order to set the position of the second image capture area 30. Since the photographing time is specified in advance or is calculated from the preliminary flight data, the position of the second image capture area 30 can be simply set without separate complex equipment.

FIG. 10 is a view showing an image capture area after the second or third image capture area being set by specifying two or more photographing times T. According to the embodiment of the present disclosure, in the second setting step S40, by specifying two or more predetermined photographing times in advance or by calculation from the preliminary flight data in the second setting step S40, image capture areas after the second or third image capture areas can be set. In the case where the image capture areas after the third image capture area are required, two or more photographing time are specified in advance or defined as functions of the preliminary flight data of the flying object, so that the second, third or later image capture areas can be set. In other words, by specifying photographing times longer than the initial photographing time of the first image capture area 20 by Δt2, Δt3, or more, the second, third or later image capture areas can be set.

Two or more photographing times are allowed to be randomly specified according to the embodiment of the present disclosure and according to the flight condition of the flying object, so that image capture areas after the second or third image capture area can be randomly created and accurate flight data adapted to each flight environment can be obtained.

According to the embodiment of the present disclosure, the preliminary flight data may be calculated by using the FPGA or arithmetic processing unit of the integrated control unit 210, the integrated processing device 300, and the controller 215. The flight data may be finally calculated by well-known three-dimensional stereo image processing techniques. According to the embodiment of the present disclosure, regarding the method for calculating the rotation data of the golf ball, the golf ball can be marked and the movement of the markings calculated in order to obtain rotation data. Also, when the golf ball is not marked, the arrangement of dimples of the golf ball can be analyzed by an image processing method, so that the rotation amount and rotational direction of the golf ball can be calculated. Other various methods of analyzing the photographed images of the flying object can be applied to the embodiment of the present invention. Regarding the methods for measuring the flight data in accordance with the embodiment of the present invention, since a variety of methods can be used to calculate the preliminary flight data and final flight data, various calculation methods may be selected and applied according to the flight condition of the flying object.

As such, when compared to the existing normal method in which the high speed image cameras 220 and 230 photograph the total camera view area 10 at equal time intervals in order to photograph the flying object, the method for measuring the flight data of a flying object by using the high speed image cameras 220 and 230 in accordance with the embodiments of the present disclosure photographs only a small area through which the flying object passes at predetermined photographing times, so that the size of the photographed image data is relatively very small. Therefore, the data transmission time is short, the computing speed for image processing is fast, and a large-capacity image data storage space is not required. Moreover, the flying object can be photographed at a desired points in time after the first photographing step S20, and a more optimal photographing time can be determined according to the flight speed and flight direction of the flying object.

Also, since the performance of expensive cameras arithmetic processing units can be reproduced by a relatively low specification high speed image camera sensor and a relatively low specification arithmetic processing unit, equipment cost is reduced.

The method for measuring the flight data of the flying object by using the high speed image camera in accordance with the embodiment of the present invention described in FIGS. 1 to 10 may be implemented in the form of a program instruction that can be executed by various computer components and may be recorded in a computer-readable recording medium. The computer-readable recording medium may include program instructions, data files, data structures and the like separately or in a combination thereof.

The program instructions recorded in the computer-readable recording medium may be specially designed and configured for the purpose of the present invention or may be well-known and available to those skilled in the field of computer software.

A magnetic medium such as a hard disk, a floppy disk and a magnetic disk, an optical recording medium such as a CD-ROM and DVD, a magnetic-optical medium such as a floptical disk, and a hardware device such as ROM, RAM, a flash memory and the like, which is specially configured to store and run program instructions are included as examples of the computer-readable recording medium. Not only a machine language code which is formed by a complier but also high-level language code which can be executed by a computer using an interpreter is included as examples of the program instruction. The hardware device may be configured to operate as one or more software modules in order to perform the processes according to the present invention, and vice versa.

While the device and method for measuring the flight data of the flying object by using the high speed image cameras 220 and 230 in accordance with the embodiments of the present invention, and a computer-readable recording medium having a program for performing the same have been described with reference to the drawings, the foregoing embodiments are merely exemplary and may be changed or modified without departing from the technical spirit of the present invention by a person having ordinary skill in the art to which the present invention pertains to. Therefore, contents related to the modification and change should be construed to be included in the scope of the present invention.

What is claimed is:

1. A device for measuring flight data of a flying object, the device comprising:
   a launch signal generator which determines whether the flying object is launched or not and generates a signal when it is determined that the flying object is launched; and
   a first high speed image camera system which comprises an integrated control unit and a high speed image camera which photographs the flying object after the launch signal generator generates the signal,
   wherein the high speed image camera has a function of designating a small image capture area at any desired location and size within a total camera view area and of photographing the designated image capture area,
   wherein, in the integrated control unit, an area where it is predicted that the flying object must pass through after the flying object is launched is set as a first image capture area, the flying object is photographed once or more in the first set image capture area by using the high speed image camera, preliminary flight data is calculated from images of the flying object photographed in the first image capture area, a second image capture area is set by using the preliminary flight data, and the flying object is photographed once or more in the second set image capture area by using the high speed image camera,
   wherein a position through which the flying object passes at a point in time when a predetermined photographing time T elapses is estimated by using the preliminary flight data, and, on the basis of the position, the second image capture area is set,
   wherein the first image capture area and the second image capture area are within the total camera view area of the high speed image camera and are smaller than the total camera view area of the high speed image camera, and
   wherein the integrated control unit controls the high speed image camera and calculates final flight data from the images photographed by the high speed image camera.

2. A device for measuring flight data of a flying object, the device comprising:
   a launch signal generator which determines whether the flying object is launched or not and generates a signal when it is determined that the flying object is launched;
   a second high speed image camera system which comprises a controller and a high speed image camera which photographs the flying object after the launch signal generator generates a signal; and
   a processing device which calculates final flight data from images photographed by the high speed image camera,
   wherein the high speed image camera has a function of designating a small image capture area at any desired location and size within a total camera view area and of photographing the designated image capture area,
   wherein the controller controls the high speed image camera and calculates preliminary flight data from the images photographed by the high speed image camera;
   wherein, in the controller, an area where it is predicted that the flying object must pass through after the flying object is launched is set as a first image capture area, the flying object is photographed once or more in the first set image capture area by using the high speed image camera, the preliminary flight data is calculated from images of the flying object photographed in the first image capture area, a second image capture area is set by using the preliminary flight data, and the flying object is photographed once or more in the second set image capture area by using the high speed image camera,
   wherein a position through which the flying object passes at a point in time when a predetermined photographing time T elapses is estimated by using the preliminary flight data, and, on the basis of the position, the second image capture area is set,
   and wherein the first image capture area and the second image capture area are within the total camera view area of the high speed image camera and are smaller than the total camera view area of the high speed image camera.

3. The device of claim 1, wherein the preliminary flight data comprises the flight speed and the flight direction of the flying object, and wherein the final flight data comprises the flight speed, the flight direction, the rotational speed, and the rotation direction of the flying object.

4. The device of claim 3, wherein at least any one of the preliminary flight data is used as the flight data.

5. The device of claim 1, wherein, when it is determined by using a launch detection camera that the flying object is launched, the launch signal generator generates the signal.

6. The device of claim 1, wherein, when it is determined by using the high speed image camera that the flying object is launched, the launch signal generator generates the signal.

7. The device of claim 1, wherein the photographing time T is specified in advance or is determined as a function of the preliminary flight data of the flying object.

8. The device of claim 7, wherein two or more photographing times are specified in advance or are determined as functions of the preliminary flight data, so that image capture areas after the second or third image capture area is set.

9. A method for measuring flight data of a flying object by using a high speed image camera, the method comprising:
   (a) a first setting step in which an area where it is predicted that the flying object must pass after the flying object is launched is set as a first image capture area;
   (b) a first photographing step in which the flying object is photographed once or more in the first image capture area by using the high speed image camera;
   (c) a preliminary calculation step in which preliminary flight data of the flying object is calculated from images photographed in the first photographing step;
   (d) a second setting step in which a second image capture area is set by using the preliminary flight data;
   (e) a second photographing step in which the flying object is photographed once or more in the second image capture area by using the high speed image camera; and
   (f) a flight data calculation step in which final flight data of the flying object is calculated from the images photographed in the first photographing step and/or the second photographing step;
   wherein the high speed image camera has a function of designating a small image capture area at any desired location and size within a total camera view area and of photographing the designated image capture area,
   wherein the first image capture area and the second image capture area are within the total camera view area of the high speed image camera and are smaller than the total camera view area of the high speed image camera,
   and wherein, in the second setting step, a position through which the flying object passes when a predetermined photographing time T elapses is estimated by using the preliminary flight data, and, on the basis of the position, the second image capture area is set.

10. The method of claim 9, wherein one or more of the preliminary flight data calculated in the preliminary calculation step is used as the flight data in the flight data calculation step.

11. The method of claim 9, further comprising a launch detection step which detects the launch of the flying object by using a launch detection camera before the first photographing step.

12. The method of claim 9, further comprising a launch detection step which detects the launch of the flying object by using the high speed image camera before the first photographing step.

13. The method of claim 9, wherein the preliminary flight data comprises the flight speed and the flight direction of the flying object, and wherein the final flight data comprises the flight speed, the flight direction, the rotational speed, and the rotation direction of the flying object.

14. The method of claim 9, wherein the photographing time T is specified in advance or is determined by a calculation from the preliminary flight data of the flying object.

15. The method of claim 9, wherein, in the second setting step, two or more predetermined photographing times are specified in advance or are determined as functions of the preliminary flight data, so that image capture areas after the second or third image capture area is set.

16. A computer-readable recording medium having a program for performing the method according to claim 9.

17. The device of claim 2, wherein the preliminary flight data comprises the flight speed and the flight direction of the flying object, and wherein the final flight data comprises the flight speed, the flight direction, the rotational speed, and the rotation direction of the flying object.

18. The device of claim 2, wherein, when it is determined by using a launch detection camera that the flying object is launched, the launch signal generator generates the signal.

19. The device of claim 2, wherein, when it is determined by using the high speed image camera that the flying object is launched, the launch signal generator generates the signal.

20. The device of claim 2, wherein the photographing time T is specified in advance or is determined as a function of the preliminary flight data of the flying object.

* * * * *